United States Patent [19]

Morse

[11] 4,178,806
[45] Dec. 18, 1979

[54] TOGGLE SWITCH SEAL

[76] Inventor: Milton Morse, 44 Honeck St., Englewood, N.J. 07631

[21] Appl. No.: 486,961

[22] Filed: Jul. 10, 1974

[51] Int. Cl.² .............................................. F16J 15/50
[52] U.S. Cl. ......................................... 74/17.8; 74/18
[58] Field of Search ...................... 74/17.8, 18, 18.1; 200/302

[56] References Cited

U.S. PATENT DOCUMENTS

| | | | |
|---|---|---|---|
| 2,440,943 | 5/1948 | Gonsett et al. | 200/302 |
| 2,795,144 | 6/1957 | Morse | 74/17.8 |
| 3,062,939 | 11/1962 | Kierspe et al. | 74/18.1 X |
| 3,420,119 | 1/1969 | Morse | 74/18 X |

Primary Examiner—C. J. Husar
Assistant Examiner—Frank Mc Kenzie
Attorney, Agent, or Firm—Charles E. Tempko

[57] ABSTRACT

An improved toggle switch seal for sealing the opening in a panel through which the toggle switch projects. As contrasted with prior art devices, the portion of the seal surrounding the toggle is relatively thick-walled to prevent ballooning, and is provided with plural annular thin-walled sections to facilitate easy lateral flexing of the seal with movement of the switch toggle, with minimum back-torque tending to return the switch to its initial position. As distinguished with stretching of the thin-walled sections, common in prior art devices, with lateral movement, the seal tends to execute a folding motion in the thin-walled sections tending to reduce the generated resilient forces tending to restore the seal to unstressed condition.

5 Claims, 6 Drawing Figures

TOGGLE SWITCH SEAL

BACKGROUND OF THE INVENTION

This invention relates generally to toggle switch boot seals of types disclosed, for example, in my prior U.S. Pat. Nos. 3,175,833 of Mar. 3, 1965; and 3,420,119 of Jan. 7, 1969.

In prior art constructions, it has been a primary purpose to achieve a good seal while at the same time allowing easy flexing with the toggle lever. This is accomplished by reducing the back-torque from the seal, and thereby avoiding the overriding detenting of the toggle switch. In the seals disclosed in the above-mentioned patents, utilization was made of thin-walled sections which easily stretch and flex, in order to allow the toggle lever to move from one extreme position to the other.

When these thinner-walled sections are used, however, the permissable internal pressures are reduced, since thinner walls have a tendency to balloon. It is possible to overcome the ballooning effect by building a rib or thicker section into the thin wall. This rib performs in a manner somewhat like a barrel hoop to reinforce the thin section against the expanding action of the internal pressure. The disadvantage of the rib becomes apparent when external pressures are applied to the sealing system, for in the latter case, the reinforcing rib is driven inwardly and takes a position which inhibits the action of the toggle. Further, in previous constructions, the dilation caused by internal pressure has tended to loosen the grip of the seal around the neck of the lever, which, in the case of a sleeve-type seal has permitted leakage.

BRIEF DESCRIPTION OF THE PRESENT INVENTION

Briefly stated, the present invention contemplates the provision of an improved seal of the class described having a convoluted inner wall in which the convolutions are so configured and located that they fold into predetermined areas and spaces when the enclosed toggle is moved. These predetermined folds prevent the outer walls of the seal from moving against and thus inhibiting the motion of the toggle lever. In addition, internal pressures do not cause undue ballooning, for the reason that the thin section of the seal is reduced to an absolute minimum.

The present seal functions largely on a series of hinging actions rather than upon the mere stretching or compressing of the elastomeric material from which the seal is formed. A further advantage of the new construction lies in the provision of reinforced sealing around the toggle lever when internal pressure is applied. This is accomplished by a reentrant or inwardly protruding portion of the sealing section through which the toggle lever passes.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENTS

Figure 1:
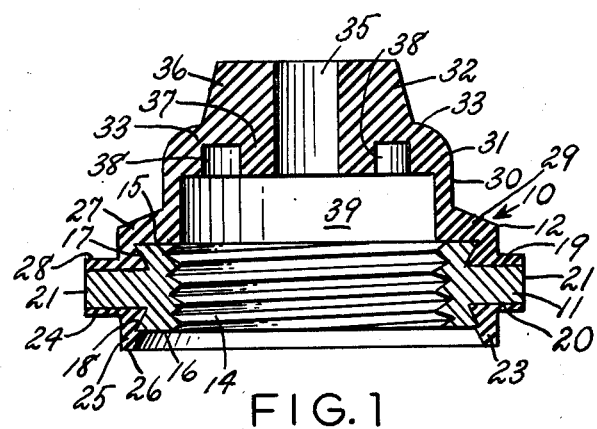
FIG. 1 is a longitudinal central sectional view of a first embodiment of the invention, as seen from the plane 1—3 in FIG. 2.
Figure 2:
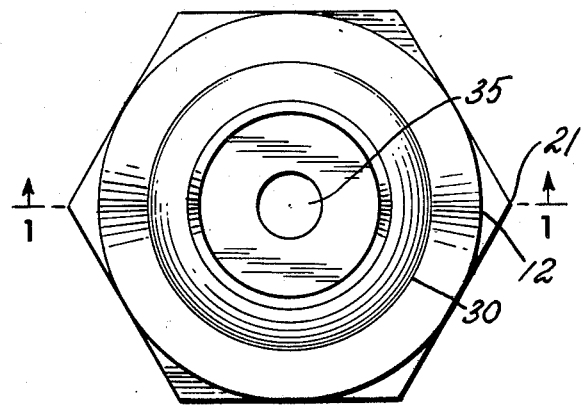
FIG. 2 is a top plan view of the first embodiment.

In accordance with the first embodiment of the invention, the device, generally indicated by reference character 10, comprises broadly: a nut element 11 and a boot element 12.

The device is manufactured using techniques well known in the art, in which the boot element is insert-molded about the nut element, the details of such process forming no part of the present disclosure.

The nut element 11 is formed of metallic materials, and includes a threaded longitudinal bore 14. It is bounded by first and second planar surfaces 15 and 16, respectively, first and second tapered surfaces 17 and 18, third and fourth planar surfaces 19 and 20, and polygonal edge surfaces 21 which permit the engagement of the device by a tool (not shown).

The boot element 12 is preferably formed from synthetic resinous resilient materials, as for example, silicone rubber, and includes a lower sealing member 23 having a planar portion 24 and a tapered lip portion 25 forming a sealing edge 26.

Disposed outwardly of the nut element 11 is a boot base 27 including a planar portion 28, a relatively thick-walled base portion 29, a relatively thin-walled intermediate portion 30 of cylindrical configuration, and a relatively thickwalled upper portion 31. The upper portion 31 interconnects with a toggle engaging or encircling member 32 through a thin-walled interconnecting area 33.

The toggle encircling member 32 defines a centrally disposed bore 35 through which an engaged toggle 34 projects. The bore 35 extends through a relatively thick-walled upper portion 36 and a relatively thin-walled lower portion 37. A downwardly-facing angular groove 38 forms the area 33, and communicates with a hollow chamber 39 surrounded by the intermediate portion 30.

Figure 5:
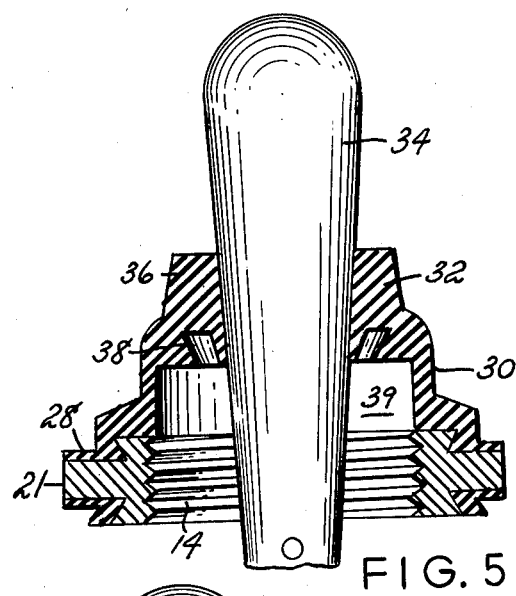
FIG. 5 is a similar longitudinal sectional view, showing the first embodiment in installed condition.

Referring to FIG. 5, it will be apparent that upon installation the groove 38 becomes somewhat trapezoidal in cross-section, but remains open so that upon the occurrence of an internal pressure differential, pressure entering the groove 38 tends to radially inwardly compress the portion 37 to enhance the seal effected upon the outer surface of the toggle.

Figure 6:
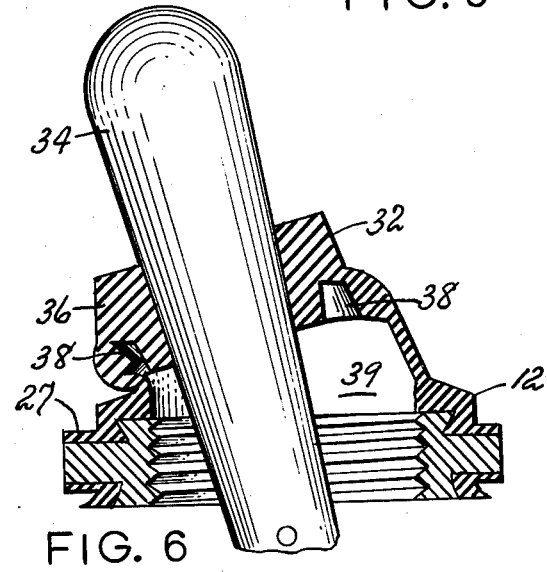
FIG. 6 is a longitudinal sectional view corresponding to that seen in FIG. 5, but showing the embodiment in deflected condition.

Referring to FIG. 6, the flexing of the boot element with movement of the switch toggle is illustrated. As seen from the lefthand portion of the figure, the boot element flexes by folding along the areas of thinner cross-section with a minimum of distortion of the areas of thicker cross-section. As observed on the righthand portion of the figure, the minimal stretching which occurs is confined to the portion 30. It will be observed that because of the fact that the major portions of the device are relatively thick-walled, the possibility of ballooning under high internal pressure differentials is of negligible degree. Since the thickwalled portions have been subjected to little if any distortion, the induced back-torque is correspondingly low, and there is no tendency for the boot to force the toggle from an engaged detent means.

Figure 3:
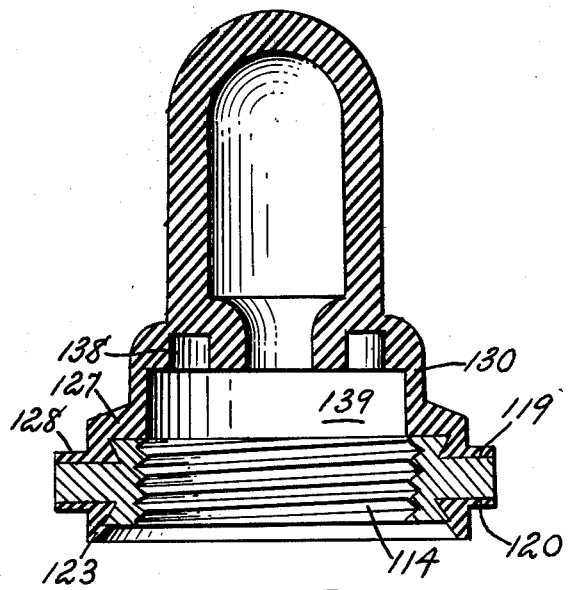
FIG. 3 is a longitudinal sectional view corresponding to FIG. 1, but showing a second embodiment of the invention.
Figure 4:
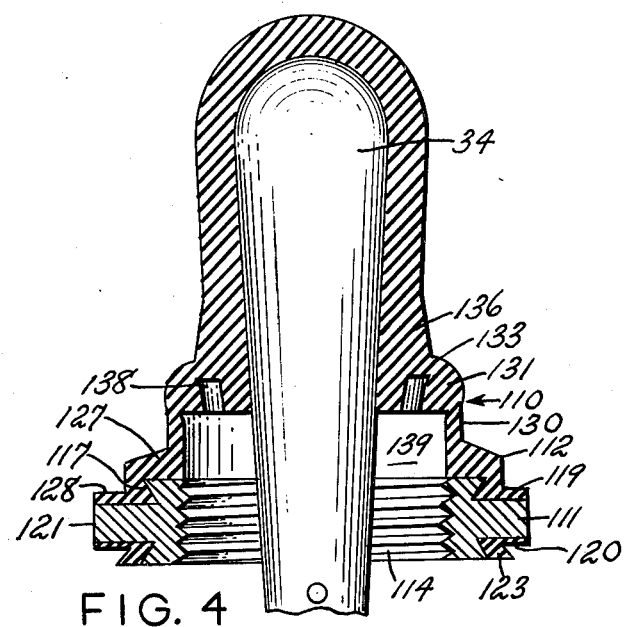
FIG. 4 is a longitudinal central sectional view of the second embodiment in installed condition.

Turning now to the second embodiment of the invention illustrated in FIGS. 3 and 4, parts corresponding to those of the first embodiment have been designated by similar reference characters with the additional prefix "1".

The second embodiment differs from the first embodiment only in the inclusion of means to completely enclose the toggle, so that total reliance need not be placed upon the thin-walled lower portion 1–37. The installation and function of this second embodiment is substantially identical with that of the first embodiment.

I wish it to be understood that I do not consider the invention limited to the precise details of structure shown and set forth in this specification, for obvious modifications will occur to those skilled in the art to which the invention pertains.

I claim:

1. In a toggle switch seal of a type performing an hermetic seal about an opening in a panel surface in which a switch having a movable toggle is positioned, said toggle switch seal including a nut element and a molded boot element surrounding said nut element, said boot element including a lower sealing member adapted to surround an opening in said panel surface and abut the same, and a toggle encircling member adapted to flex relative to said nut member with movement of said toggle, the improvement comprising: said toggle encircling member including a relatively thick-walled base abutting a planar end surface of said nut element, a relatively thin-walled intermediate portion extending longitudinally outwardly of the axis of said nut element and defining a cylindrical chamber interconnected to said base, a relatively thick-walled upper portion connected to said intermediate thin-walled portion, said upper portion defining an axially disposed bore communicating with said chamber, and an annular groove coaxially disposed with respect to said bore, said groove forming an annular area of relatively thin cross section in said upper member; whereby upon the flexing of said boot element by movement of an engaged toggle, said boot element tends to fold about said thin-walled intermediate portion and said last-mentioned annular area on one said thereof, with a minimum of distortion of the relatively thick-walled base and upper portion.

2. Structure in accordance with claim 1, in which said annular groove is of rectangular cross-section.

3. Structure in accordance with claim 1, in which said annular groove is positioned to surround a portion of said toggle encircling member, whereby upon the presence of an internal pressure differential, the surrounded portion is radially inwardly compressed against an encircled toggle.

4. Structure in accordance with claim 1, in which said toggle encircling member is open-ended.

5. Structure in accordance with claim 1, in which said toggle encircling member includes an end wall to completely enclose an engaged toggle.

* * * * *